Jan. 21, 1930.　　　J. W. DAVIS　　　1,744,108
LIQUEFACTION APPARATUS
Filed July 3, 1924
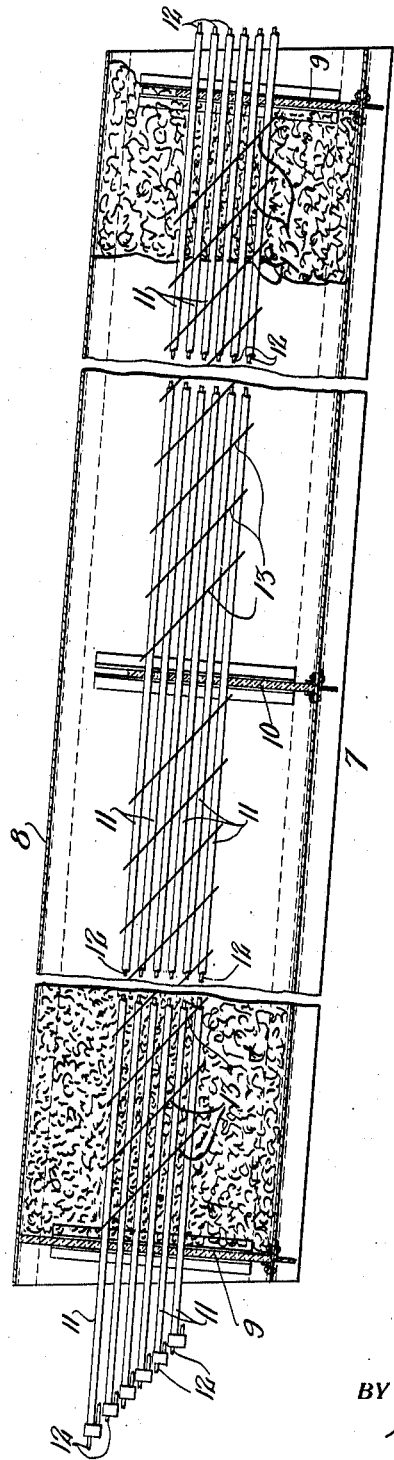
WITNESS.
INVENTOR
John. W. Davis.
BY
ATTORNEYS Patented Jan. 21, 1930

1,744,108

UNITED STATES PATENT OFFICE

JOHN W. DAVIS, OF FORT WORTH, TEXAS, ASSIGNOR TO SAMUEL G. ALLEN, TRUSTEE

LIQUEFACTION APPARATUS

Application filed July 3, 1924. Serial No. 723,865.

This invention relates to heat exchange mechanism of liquefying systems for separating elements of gaseous mixtures, and it is particularly useful in interchangers, liquefiers or other portions of the apparatus employing a multiplicity of tubes.

I have discovered that the temperature sometimes varies across the tubes where the temperature should be uniform if the best results are obtained. Furthermore, in case a tube becomes plugged it becomes wholly ineffective in present apparatus and will remain so until the plug loosens of itself or the system is warmed up.

I propose to provide means tending to maintain the temperature uniform across tubes to minimize the effect of plugging and help in warming up to dissipate plugs if formed.

For the purpose of illustration only, I have shown the invention as applied to a multitube liquefier such as set forth in an application of Wm. L. De Baufre and myself, Serial No. 683,273, filed Dec. 29th, 1923.

In the drawing the figure is a partial side elevation of and section through the liquefier.

The liquefier is composed of a box or casing 7, open at the top and closed by the cover 8; the end plates 9 and the intermediate plate 10, all of which may be made of bakelite or other suitable material; and the tubes 11 and 12, the former being the upcomer or return tubes, and the latter, the downcomer tubes. The downcomer tubes extend within the return tubes, and the latter pass through holes in the plates 9 and 10 which serve to position the tubes.

It will be understood that there are rows of the tubes across the box, only the end ones appearing in the figure; and that the box is filled with mineral wool or other insulating material.

At any cross-section taken through the liquefier and across the tubes, the temperature of the tubes should be substantially the same as above pointed out, and to this end, I provide a plurality of thin, spaced plates 13, made of copper or other conductive material. These plates are apertured to receive the tubes and they are secured in tight engagement with the tubes, as by sweating. The plates are spaced fairly closely, say 6" apart. They function to conduct heat and equalize the temperature of the tubes, and in the present instance the equalizing of the temperature of the return tubes secures equalization of temperature of the downcomer tubes. The equalization would have a tendency to prevent serious results from partial plugging.

The plates are shown inclined for the reason that the rows of tubes are arranged in stepped relation.

I claim:

1. In apparatus for separating gaseous mixtures by liquefaction of the undesired constituents, a plurality of elements within each of which heat exchange takes place, and conductive plates contacting with the elements and arranged at spaced intervals and operating by conduction to equalize the temperatures of the elements.

2. In apparatus for separating gaseous mixtures by liquefaction of the undesired constituents, a plurality of elements within each of which heat exchange takes place, and conductive plates contacting with the elements and arranged at spaced intervals and operating by conduction to equalize the temperatures of the elements, together with a case and insulating material in which the elements and plates are embedded.

In testimony whereof, I have hereunto signed my name.

JOHN W. DAVIS.